United States Patent
Børve

(10) Patent No.: US 6,716,926 B1
(45) Date of Patent: Apr. 6, 2004

(54) METHOD FOR THE MODIFICATION OF POLYOLEFINS

(75) Inventor: Kjetil L. Børve, Tjodalyng (NO)

(73) Assignee: Borealis Technology Oy, Porvoo (FI)

( * ) Notice: Subject to any disclaimer, the term of this patent is extended or adjusted under 35 U.S.C. 154(b) by 5 days.

(21) Appl. No.: 10/031,224

(22) PCT Filed: Jul. 7, 2000

(86) PCT No.: PCT/EP00/06478

§ 371 (c)(1),
(2), (4) Date: Apr. 26, 2002

(87) PCT Pub. No.: WO01/05858

PCT Pub. Date: Jan. 25, 2001

(30) Foreign Application Priority Data

Jul. 16, 1999 (NO) .......................................... 19993507

(51) Int. Cl.[7] ......................... C08L 51/06; C08L 23/10; C08F 255/02
(52) U.S. Cl. ........................... 525/242; 525/63; 525/73; 525/74; 525/78; 525/263
(58) Field of Search ........................... 525/242, 63, 73, 525/74, 78, 263

(56) References Cited

U.S. PATENT DOCUMENTS 6,093,773 A * 7/2000 Evans et al. .................. 525/73

OTHER PUBLICATIONS

International Search Report pertaining to International Application No. PCT/EP/06478.

* cited by examiner

Primary Examiner—Samuel A. Acquah
Assistant Examiner—Olga Asinovsky
(74) Attorney, Agent, or Firm—Fay, Sharpe, Fagan, Minnich & McKee, LLP

(57) ABSTRACT

A process for obtaining a polyolefin composition endowed with improved adhesion performance, especially paintability, comprising premixing a high-flow polyolefin resin with one or more grafting monomers and initiator, possibly also one or more comonomers, feeding the obtained premix and a low-flow polyolefin resin into a mixing device, and gradually heating the components to above their melting points while being subjected to mixing forces. The process may be carried out in an extruder, and polyether amine may optionally be introduced into the extruding mass downstream of the feeding point.

20 Claims, No Drawings

METHOD FOR THE MODIFICATION OF POLYOLEFINS

FIELD OF THE INVENTION

The present invention relates to a process for the modification of polyolefins to give them improved adhesion performances.

RELATED ART

Polyolefins are known to present poor adhesion to paints, glues and inks. To improve their adhesion properties they need to be chemically modified with polar groups. This could be achieved by blending or alloying the polyolefin resin with engineering polymers, by the functionalization of the polyolefin with specific monomers, or by applying post-treatment methods, such as the use of oxygen plasma and flaming. Polyolefins being modified by graft reactions performed in melt processing equipment, such as single or multiple screw extruders, include well known technologies widely reported in the technical literature.

U.S. Pat. No. 5,001,197 discloses a process for functionalization and preferably maleation of a polypropylene by the use of a selected class of peroxides that will not significantly decreased the molecular weight of the polypropylene.

EP 0 634 424 discloses a compound comprised of polypropylene and the reaction product of a maleated polypropylene and polyether amine. A process for producing the polymer compound involves two steps, first preparation of the maleated polypropylene, then reacting this maleated polypropylene with the polyether amine by melting the components in the presence of a polypropylene in a customary mixing apparatus.

U.S. Pat. No. 5,281,670 discloses a blend comprising polybutylene and functionalized polyolefins having an improved adhesion to metals and polar polymers. The blend can be made by any conventional blending process, which in general include the steps of tumbling the polybutylene and functionalized polyolefin in a mixer, feeding the mixture into a melt mixing device, such as a Brabender mixer or continuous single or twin screw extruder.

WO 96/06872 discloses a method of grafting a polypropylene resin with an allyl epoxy compound in the presence of styrene. The polypropylene mixed with the allyl epoxy compound, styrene and a peroxide initiator is heated to a suitable reaction temperature at conditions of continuous mixing, preferably in an extruder, until a desired degree of grafting has been obtained. The disclosures of this publication is included herein by reference.

U.S. Pat. No. 5,424,367 discloses an extruder having multiple reaction zones. Each reaction zone is provided with means for introducing reagents, mixing the reagents with polymer and removal of bi/co-products or unreacted reagents. Each reaction zone is followed by a purification zone where volatile products are vented off. This extruder is used in grafting a polyolefin with maleic anhydride, followed by imidization of the grafted anhydride with a primary amine in the second reaction zone.

The prior art grafting methods used to modify polyolefins will not result in a sufficient level of polar molecules in the surface layer of the final article to obtain an acceptable paintability. Moreover, the overall desired mechanical properties will become significantly reduced. Blending methods normally involve several compounding steps and the cost of the resulting material will hardly be justified. The post-treatment methods mentioned above, which are used to increase directly the polarity of the surface to be painted, are normally very time-consuming, and often high investments in special equipment will be needed. Therefore, it still exists a need for polyolefin resins that are available at an acceptable cost and which can be manufactured into final articles having an inherent paintability.

It has now surprisingly been found that an extrusion process may be used to obtain a modified polyolefin blend comprising polypropylene resins that are selectively functionalized with polar molecules. In a final article obtained according to the present invention the polar molecules will become localized in the surface layer of the article and thus make it paintable.

SUMMARY OF THE INVENTION

The present invention provides a process for obtaining a polyolefin composition endowed with improved adhesion performance, comprising the steps of premixing a high-flow polyolefin resin with one or more grafting monomers and initiator, optionally also one or more comonomers, feeding the obtained premix and a low-flow polyolefin resin into a mixing device, and gradually heating the components to above their melting points while being subjected to mixing forces.

The present invention also provides process for obtaining a polyolefin composition endowed with improved adhesion performance, comprising the steps of premixing a high-flow polypropylene polymer with one or more grafting monomers and initiator, optionally also one or more comonomers, feeding the obtained premix and a low-flow polyolefin resin into an extruder or a series of extruders provided with mixing elements, gradually heating the components to above their melting points while being subjected to mixing forces, and introducing at least one polyether amine into the extruder through a second inlet feed opening, downstream of the first inlet opening, localized at a point where at least a main part of the already introduced components are in a molten state.

DETAILED DESCRIPTION OF THE INVENTION

To obtain a polyolefin based article that can be painted, at least the surface layer of the article must contain polar groups that make the surface material compatible with the applied paint film material. By the present invention the polyolefin material is blended with a polar component that will migrate to the surface of the article and selectively provide the surface layer with polar groups which make the article paintable. To maintain the favourable properties of polyolefins both components should be based on polyolefin resins, preferably polypropylene based resins. Consequently, the polyolefin resin to be grafted is selected from polypropylenes having relatively short chain lengths. However, such polypropylene grades will not alone have an acceptable range of properties and therefore must be-supported by another polyolefin resin. Thus, in a final article the grafted polypropylene component will provide the paintability, and the other polyolefin components will provide the required mechanical properties.

According to the present invention it is provided a process for sequentially grafting a high-flow polypropylene resin and then blending this grafted resin with a low-flow polyolefin resin. The selected polypropylene and polyolefin grades must be matched with each other in such a way that the one to be grafted will melt first and react with the grafting monomers before any substantial part of the low-flow polypropylene component has melted. This is achieved by the process of the present invention.

In this application the term "high-flow resin" is used to describe a resin that melts relatively easy and has a lower melt viscosity, while the term "low-flow resin" is used to describe a resin that has a higher melt viscosity.

Suitable high-flow polypropylene resins to be used by the present process comprise all polypropylene homopolymers and copolymers that can be grafted with reactive, functionalizing agents. Particularly preferred polypropylenes are polypropylene homopolymers, and copolymers of propylene with ethylene, containing up to 30% of ethylene. These polypropylenes should preferably have a weight average molecular weight (MW) of 5000 to 500.000, preferably from 10.000 to 200.000. The melt flow index (MFI) should be in the range from 0.1 to 1000 g/10 min, preferably from 20 to 1000 g/10 min, more preferably from 20 to 100 g/10 min, determined according to the method of ASTM D 1238 (230° C. and 2.16 kg load). The polypropylene resins may be used as pellets or as a powder, preferably as a powder. The powder may be milled granules or corresponding material, or it may be the polymer substance as obtained from a polymerisation reactor, stabilized or non-stabilized.

Suitable low-flow polyolefin resins to be used by the present process in-principle comprise all polypropylene homopolymers and copolymers having a suitable melt flow index that is lower than the melt flow index of the used high-flow resin. The melt flow index may be in the range from 0.01 to 80 g/10 min, preferably from 0.1 to 30 g/10 min, determined according to the method of ASTM D 1238 (230° C. and 2.16 kg load). Preferred polyolefins are copolymers of propylene with ethylene, having a high ethylene content. Particularly suitable polyolefins are reactor made thermoplastic ethylene-propylene copolymers (R-TPO) containing up to 50% of ethylene. Such polyolefins should preferably have a weight average molecular weight (MW) in the range from 150.000 to 500.000. In the process of the present invention this polyolefin is conveniently used as pellets.

To initiate the grafting process a number of free radical generating compounds may be used, for example peroxide compounds, or initiation by radiation. Organic peroxides that are particularly useful as radical-generating compounds in the grafting process are those which have a decomposition temperature lower than the processing temperature of the high-flow polypropylene resin to be grafted. Suitable peroxide initiators may be selected from the group comprising t-butyl-peroxy benzoate, t-butyl-peroxy-n-butyl fumarate, azo-bis-butyronitril, bis-tert-butyl peroxy-isopropyl benzene, and dicumyl peroxide.

The functionalizing agent employed in the process of this invention may be any of the unsaturated monomers conventionally used to functionalize polyolefins. Such functionalizing agents include olefinically unsaturated acids, for example monocarboxylic acids, such as acrylic and methacrylic acid, dicarboxylic acids, such as fumaric, maleic and itaconic acids; dicarboxylic anhydrides, such as maleic anhydride, and the corresponding tert.-butyl esters thereof. A preferred functionalizing agent for use in the process of the present invention is maleic anhydride (MAH).

Other compounds suitable for being grafted onto the polymer chains may be selected from the group comprising sulfo- or sulfonyl-containing monomers; oxazolinyl-containing monomers; and epoxy-containing monomers, such as allyl glycidyl ether, glycidyl acrylate or glycidyl (meth)acrylate. Particularly useful epoxy-containing monomers are those having the formula:

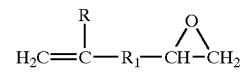

in which R is H or a $C_{1-4}$ alkyl; and $R_1$ is —$(CH_2)_n$—, —C(O)O—$(CH_2)_n$—, or —$(CH_2)_n$—O—, and n is an integer of 1 to 4. Preferably R is H or $CH_3$, more preferably $CH_3$, while $R_1$ is preferably —C(O)O—$(CH_2)_n$—, making glycidyl methacrylate a preferred compound.

Also styrenic compounds may be grafted onto the polymer chains as a comonomer. Suitable styrenic compounds are those having the formula:

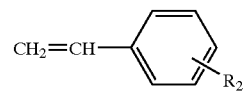

in which $R_2$ is H, OH, $CH_3$ or allyl. Preferably $R_2$ is H, making styrene the most preferred styrenic compound.

The required grafting conditions may conveniently be obtained in a number of mixing devices known within the field of plastic processing. A preferred mixing device is an extruder or a series of extruders of suitable size and design. A twin screw extruder having co-rotating intermeshing screws or a single screw extruder may be used alone or in any combination, such as in tandem extrusions. The extruder may be provided with a vacuum venting at the extruder outlet. The grafting conditions have to be adapted to the type of extruder used, as will be well known to a skilled person. A prerequisite for achieving a desired degree of grafting is to obtain an intimate mixing of the polypropylene, the initiator and the grafting monomers at a temperature that is higher than both the melting point of the polymer and the decomposition temperature of the peroxide. It is also important to have a sufficient residence time to secure the completion of the grafting reactions. The temperature inside the extruder is within the range from 90 to 300° C., preferably within the range of 100 to 250° C.

The components may be fed to the mixing machine in any practical way. Optionally, they may be premixed by the use of any conventional mixer, or by any mixing method known in the art. All components are fed from the same feed hopper into the extruder.

To obtain an optimal degree of grafting, 100 parts by weight of the high-flow polypropylene resin, preferably in the form of a powder, is admixed with up to 10 parts by weight of the peroxide compound and up to 10 parts by weight of the grafting monomer. Obviously, the actual amounts of the peroxide and monomer compounds will depend on the particular types of compounds used, and the invention is not restricted to specific amounts of the grafting compounds. This mixture of high-flow polypropylene, peroxide and monomer is then blended for a sufficient period of time to obtain a proper distribution and absorption of the reactive components into the powder. This mixture is then fed into the extruder together with a low-flow polyolefin material, preferably being in the form of pellets. Inside the extruder the high-flow polypropylene powder will have melted completely before a substantial part of the low-flow polyolefin pellets have melted. At the used temperature setting the peroxide will decompose and initiate the grafting reactions. The grafting monomers will react mainly with the easy flowing molten polymer chains of the high-flow polypropylene resin, which will be selectively grafted. As the low-flow polyolefin resin melts it will be blended with the already grafted resin. The final homogeneous melt is ultimately extruded, for instance as strands which may be pelletised in a conventional manner.

A composition obtained by the present process may contain an amount of grafted monomer up to 15%, preferably up to 10%, more preferably from 2 to 5% by weight of the starting, neat polyolefin resin.

To further improve the polar properties of the final polymer composition the monomers grafted onto the high-flow polypropylene may in a further step be reacted for example with a suitable amine compound, such as a mono- or diamine, preferably a diamine. Conventionally used amines are polyether amines. Suitable polyether blocks in the polyether amine may be selected from the group comprising polyethylene glycol, polypropylene glycol, copolymers thereof, poly(1,2-butylene-glycol) and poly(tetramethyleneglycol). Preferred polyether amines include monoamines, diamines and triamines, having a molecular weight from 150 to 12000 g/mol. More preferred are polyether diamines having a molecular weight of about 2000 g/mol.

The polyether amine is reacted with the grafted monomers in an integrated step of the very same extrusion process. This is achieved by introducing a polyether amine into the extruder through a second feed inlet opening situated downstream of the first inlet opening. This second inlet opening must be positioned in a distance from the first inlet opening where at least a substantial part of the polypropylene has been grafted with the functionalizing monomer. Optionally, when a tandem extruder line is used this second component may be introduced into the second, tandem extruder. The polyether amine will thereby become mixed into the melt and react with the chains grafted onto the polypropylene backbone. The obtained blend may then be extruded as explained above.

The composition of the invention is especially well suited for use as an engineering plastic resin in articles that are to be painted, printed or dyed. In such articles a substantial part of the high-flow grafted polypropylene component of the composition will migrate to the surface of the article. As a result, the surface will become enriched with polar molecules, and this will highly improve the adhesion between the surface of the article and applied substrates containing polar polymers, such as paints. In particular, this is important in painted articles, such as automotive interior and exterior parts. Articles made from the compositions of the present invention will be endowed with improved printability, often important within fields such as household appliances and packaging. Improved dyeability is important in articles such as fibers.

Even if the present invention is described with reference to polyolefin resins, and in particular polypropylene resins, the concept of this invention can easily be applied with a wide range of polymeric materials, such as polypropylene homopolymers; copolymers of propylene with ethylene, containing from 0.1 to 25% by weight of ethylene; blends of polypropylene with polyethylenes such as high density polyethylene (HDPE), low density polyethylene (LDPE), linear low density polyethylene (LLDPE); ethylene propylene rubbers (EPR); alloys of polypropylene with another thermoplastic polymer selected from the group comprising polyamides (PA), polyethylene terephthalates (PET), polybutylene terephthalates (PBT), polycarbonates (PC) and polystyrenes (PS); and ethylene acrylic copolymer such as EMA, EBA, and EEA. Polypropylene blends or alloys may contain the second polymer component in an amount from 0.1 to 40% by weight based on the weight of the polymer composition.

The word "comprising" and other forms of the word "comprising" used in this description and in the claims does not limit the claimed invention to exclude any variations or additions which are obvious to the person skilled in the art and which do not have a material effect upon the invention.

The invention is illustrated with the following working examples showing in more details specific features and preferred embodiments of the invention. However, the invention is not restricted to these embodiments, and variations and deviations therefrom will be obvious to a person skilled in the art.

EXAMPLES

EQUIPMENT

The extruder used in the examples was a Clextral BC 21 twin screw extruder having a screw diameter of D=25 mm and a barrel length of L=44 D.

COMPONENTS

The following components were used in the examples:

High-flow polypronylene resin, a PP homopolymer having a MFI of 37 g/10 min (230° C./2.16 kg), commercially available under the trade name of "Borealis HH 420 J" from Borealis AS.

Low-flow polvolefin resin, a reactor produced thermoplastic ethylene-propylene copolymer (R-TPO) having a MFI of 8 g/10 min (230° C./2.16 kg), commercially available under the trade name of "Borealis ED 050 T" from Borealis AS.

Polyether diamine (PEA), commercially available under the trade name of "Jeffamine XTJ 418" from Huntsman Corp.

Peroxide, t-butyl peroxy benzoate, commercially available as a 98% solution under the trade name of "Trigonox C" from Akzo Nobel.

Maleic anhydride (MAH) was of a common commercial grade.

Test Methods

The melt flow index was determined according to the method of ASTM 1238.

The materials obtained in the examples were injection moulded into sheets having a thickness of about 2 mm and stored at ambient conditions for 2 days. The sheets were then subjected to the Gitterschnitt paint adhesion test according to the test method of DIN 53151. The paint adhesion tests were performed with solvent-borne polyurethane "2K PUR" paints. The adhesion was evaluated and classified according to 100%=excellent adhesion, 0%=no adhesion.

In the following examples all quantities of constituents are given in parts by weight based on 100 parts by weight of the final composition. Amounts used and results obtained are presented in Table 1.

Example 1

A high-flow polypropylene resin taken directly from the reactor as a powder was used. A quantity of 86 parts of this polypropylene resin was mixed with 2.5 parts of maleic anhydride and 1.5 parts of peroxide, and blended for 1 hour. The obtained mixture and 10 parts of R-TPO polymer were fed together to the extruder specified above. The temperature of the extruder was set at 200° C., and the screw speed was adjusted to 150 rpm, which resulted in an output of 3 kg/h. This blend was extruded as strands which were cooled by water and chopped into granules in a conventional manner.

Example 2

The procedure of Example 1 was followed, except that 84 parts of the polypropylene resin, 4.0 parts of maleic anhydride, 2 parts of the peroxide and 10 parts of the R-TPO polymer were used.

Example 3

The procedure of Example 1 was followed, except that 64 parts of the polypropylene resin, 4 parts of maleic anhydride, 2 parts of the peroxide and 30 parts of R-TPO were used.

Example 4

The procedure of Example 1 was followed, except that 54 parts of the polypropylene resin, 4 parts of maleic anhydride, 2 parts of the peroxide and 40 parts of R-TPO were used.

Example 5

The procedure of Example 1 was followed, except that 20 parts of the polypropylene resin, 4 parts of maleic anhydride, 2 parts of the peroxide and 74 parts of R-TPO were used.

Example 6 (comparative)

The high-flow polypropylene resin used in Example 1 was extruded alone at the conditions specified above.

Example 7 (comparative)

The R-TPO resin used in Example 1 was extruded alone at the conditions specified above.

Example 8 (comparative)

The procedure of Example 3 was followed, except that the maleic anhydride monomer and peroxide were mixed and absorbed onto R-TPO pellets instead of PP powder.

Example 9

A high-flow polypropylene resin taken directly from the reactor as a powder was used. A quantity of 84 parts this polypropylene resin was mixed with 4.0 parts of maleic anhydride and 1.5 parts of peroxide, and blended for 1 hour. The obtained mixture and 10 parts of R-TPO polymer were fed together to the above specified extruder. In a position 20 D downstream of the feed inlet opening of the extruder, the polyether diamine was introduced into the extruder in a quantity of 3.5 parts per hundred parts (pph) of the combined quantities of PP and R-TPO. The temperature profile of the extruder was set at 200° C., and the screw speed was adjusted to 150 rpm, which resulted in an output of 3 kg/h. This blend was extruded as strands which were cooled by water and chopped into granules in a conventional manner.

Example 10

The procedure of Example 9 was followed, except that 20 parts of the polypropylene resin, 4 parts of maleic anhydride, 2 parts of the peroxide, 74 parts of R-TPO and 5.0 pph of polyether diamine were used.

Example 11 (comparative)

The composition obtained in Example 5 was subsequently in a separate step mixed with 5 pph of the polyether diamine and extruded in a conventional manner at the extrusion conditions used in Example 1.

This example represents the traditional two step method of producing a modified PP composition.

The testing parameters and the obtained results are summarized in Table 1. The polypropylene based compositions obtained by the process of the present invention (Examples 1 to 5 and 9 to 10) have excellent adhesion properties and perform equally well to the composition obtained by the prior art process (Example 11). The polyolefin grades not modified (comparative examples 6 and 7) have no adhesion to paint at all.

The results show that the present process allows specific functionalization of a high-flow polypropylene component and corresponding improvement of the adhesion properties of the obtained composition. Moreover, coupling of the grafted monomers with e.g. polyether diamines during the same one step extrusion process is also an option.

TABLE 1

| Example | PP ho (parts) | TPO (parts) | Peroxide (parts) | MAH (parts) | PEA pph | Paint adhesion, % |
|---|---|---|---|---|---|---|
| 1 | 86 | 10 | 1.5 | 2.5 | none | 80–100 |
| 2 | 84 | 10 | 2.0 | 4.0 | none | 100 |
| 3 | 64 | 30 | 2.0 | 4.0 | none | 100 |
| 4 | 54 | 40 | 2.0 | 4.0 | none | 100 |
| 5 | 20 | 74 | 2.0 | 4.0 | none | 80–100 |
| 6 Comp. | 100 | | | | none | 0 |
| 7 Comp. | | 100 | | | none | 0 |
| 8 Comp.[a] | 64 | 30 | 2.0 | 4.0 | none | 10–30 |
| 9 | 84 | 10 | 2.0 | 4.0 | 3.5 | 100 |
| 10 | 20 | 74 | 2.0 | 4.0 | 5.0 | 100 |
| 11 Comp.[b] | 20 | 74 | 2.0 | 4.0 | 5.0 | 100 |

[a]MAH mixed with TPO instead of PP
[b]Two-step process

What is claimed is:

1. A process for obtaining a polyolefin composition endowed with improved adhesion performance, comprising the steps of:
    i) premising a high-flow polyolefin resin with one or more grafting monomers and initiator, optionally also one or more comonomers,
    ii) feeding the obtained premix and low-flow polyolefin resin into a mixing device, and gradually heating the components to above their melting points while being subjected to mixing forces.

2. The process of claim 1, wherein the polyolefin resins are polypropylene based resins.

3. The process of claim 1, wherein the high-flow polypropylene resin has a MFI of 0,1 to 1000 g/10 min.

4. The process of claim 1, wherein the low-flow polypropylene resin has a MFI of 0,01 to 80 g/10 min.

5. The process of claim 1, wherein the high-flow polypropylene is in the form of a powder and that the low-flow polypropylene is in the form of pellets.

6. The process of claim 1, wherein the grafting monomer is selected from the group comprising acrylic and methacrylic acids; fumaric, maleic and itaconic acids; maleic anhydride and the corresponding tert.-butyl esters thereof.

7. The process of claim 1, wherein the initiator is selected from the group comprising t-buytl-peroxy benzoate, t-butyl-peroxy-n-butyl fumarate, azo-bis-butyronitril, bis-tert-butyl peroxy-isopropyl benzene, and dicumyl peroxide.

8. The process of claim 1, wherein an extruder is used as the mixing device.

9. A process for obtaining a polyolefin composition endowed with improved adhesion performance, comprising the steps of:
   I) premixing a high-flow polyolefin resin with one or more grafting monomers and initiator, optionally also one or more comonomers,
   ii) feeding the obtained premix and a low-flow polyolefin resin into an extruder or a series of extruders provided with mixing elements, gradually heating the components to above their melting points while being subjected to mixing forces, and
   iii) introducing at least one polyether amine into the extruder through a second inlet feed opening, downstream of the first inlet opening, localized at a point where at least a main part of the already introduced components are in a molten state.

10. The process of claim 9, wherein the grafting monomer is maleic anhydride.

11. The process of claim 9, wherein the polyether amine is a polyether diamine.

12. The process of claim 9, wherein the grafting monomer is styrene.

13. The process of claim 2, wherein the high-flow polypropylene resin has a MFI of 0,1 to 1000 g/10 min.

14. The process of claim 2, wherein the low-flow polypropylene resin has a MFI of 0,01 to 80 g/10 min.

15. The process of claim 3, wherein the low-flow polypropylene resin has a MFI of 0,01 to 80 g/10 min.

16. The process of claim 2, wherein the high-flow polypropylene is in the form of a powder and that the low-flow polypropylene is in the form of pellets.

17. The process of claim 3, wherein the high-flow polypropylene is in the form of a powder and that the low-flow polypropylene is in the form of pellets.

18. The process of claim 2, wherein the grafting monomer is selected from the group comprising acrylic and methacrylic acids; fumaric, maleic and itaconic acids; maleic anhydride and the corresponding tert.-butyl esters thereof.

19. The process of claim 2, wherein the initiator is selected from the group comprising t-buytl-peroxy benzoate, t-butyl-peroxy-n-butyl fumarate, azo-bis-butyronitril, bis-tert-butyl peroxy-isopropyl benzene, and dicumyl peroxide.

20. The process of claim 2, wherein an extruder is used as the mixing device.

* * * * *